Dec. 26, 1967 E. A. POWERS 3,360,129
GRAVEL CLEANER FOR AQUARIUMS
Original Filed Jan. 19, 1965
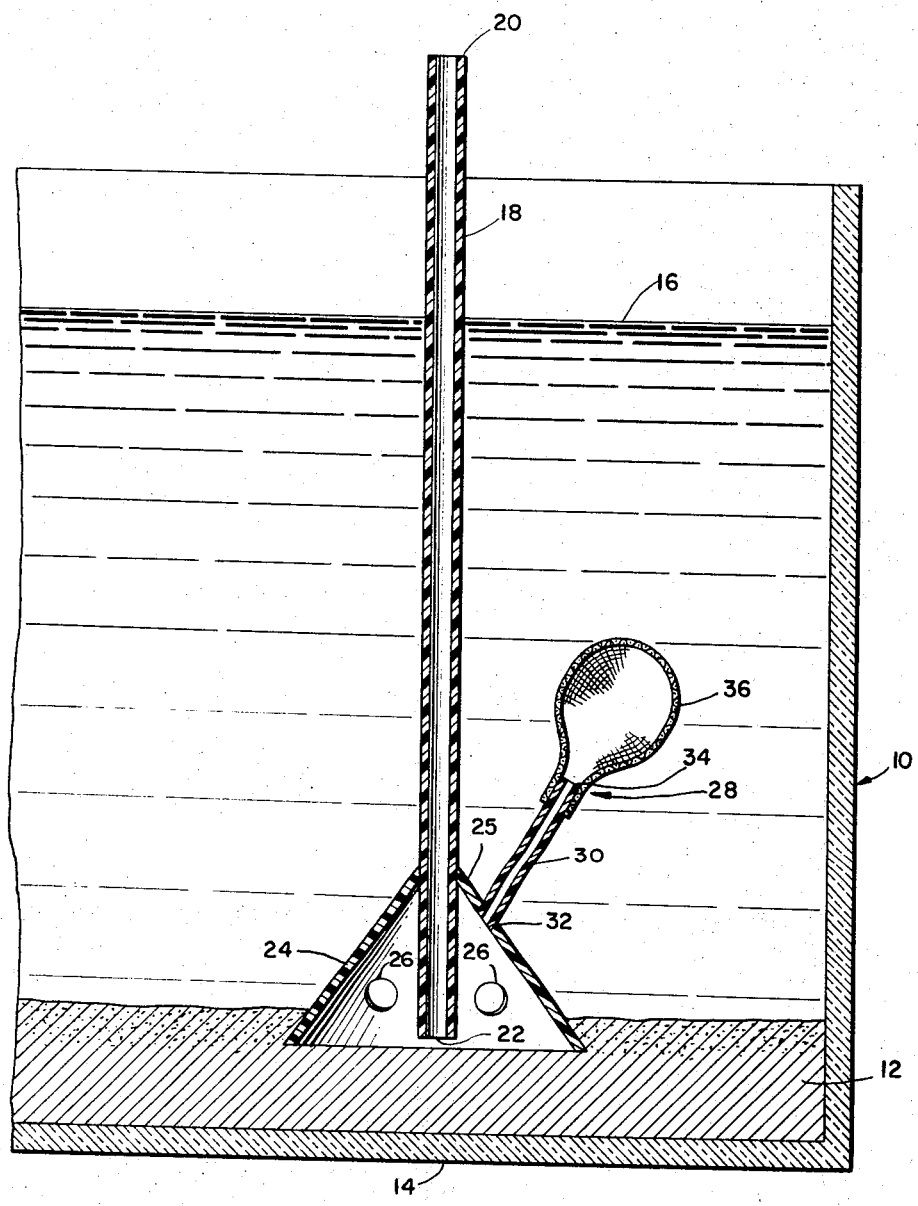
INVENTOR
Edgar A. Powers

United States Patent Office 3,360,129
Patented Dec. 26, 1967

3,360,129
GRAVEL CLEANER FOR AQUARIUMS
Edgar A. Powers, 104 Church St.,
Lake Ronkonkoma, N.Y. 11779
Continuation of application Ser. No. 426,510, Jan. 19, 1965. This application Apr. 9, 1965, Ser. No. 447,030
11 Claims. (Cl. 210—169)

ABSTRACT OF THE DISCLOSURE

Aquarium tank cleaner and filter composed of a hollow base member having a side wall, an open lower end adapted to seat in the particulate bed of a functioning aquarium with an air tube extending into the member and having a lower end positioned within the interior thereof to discharge air into the bed and agitate it and to create a vacuum in the base member with its side wall having apertures above the tube's lower end for water to enter the base member under the vacuum conditions therein and a water outflow tube at the side wall above the apertures with a disposable porous filter on the outer end of the outflow tube to entrap impurities from the discharging water.

---

This application is a continuation of my copending application, Serial No. 426,510, filed Jan. 19, 1965 (now abandoned).

The general object of this invention is to provide a simple, compact, easily manipulated, inexpensive means of removing dirt and impurities which lodge in the gravel areas within the bases of aquariums. There are many known devices used for circulating, aerating and filtering the water in aquariums, but heretofore, as known, each such device is intended to aerate and clean the water and provide, as an end, improved water conditions in the aquarium.

However effective such devices may be in realizing their prime objective, there are many defects, from a cost and operational standpoint, associated therewith.

Conventional aerating and filtering devices for aquariums are cumbersome, bulky and require a maximum of care and constant replacement.

Conventional devices of this type tend to impair and interfere with the circulation of the water in the aquarium.

Conventional devices must be removed for cleaning purposes at frequent times, or else the circulation within the cleaning or cleansing chambers as portions thereof becomes ineffective.

Conventional devices tend to transmit impurities in the water to a point above the water level in the tank, which tendency has a decided effect on the circulation of the water in the tank.

Conventional devices provide no agitation means other than a discharge of air bubbles above the upper level of the gravel bed in the bottom of the tank and rely entirely upon water circulation for the dislodgement of dirt and impurities from the gravel.

Conventional devices are constructed with means adapted to be disposed above the tank and to cooperate with means immersed in the water in the tank, such above water level means requiring excessive storage place, replacement, servicing and involving clumsy manipulation.

Having in mind these defects in conventional devices of this type and in the prior art, the primary aim and objective of the present invention is to overcome these defects and to provide an extremely simple, compact and efficient device which, in essence, is devoid of any moving parts and which is constituted by only a minimum number of components; yet, which functions in an optimum manner to achieve the desired result of circulating, aerating and (most important) filtering the water in an aquarium.

Another important object of the present invention is to provide a device for filtering, aerating and conditioning the water in an aquarium in a manner so that a greater turbulence within the gravel bed area is created and a faster and more constant circulation of the water is realized.

A further important object of the present invention is to provide a device which, because of its simplicity, translated into constructional, purchasing and operational costs, is remarkable in achieving the end result of optimum water conditions in an aquarium and which will be within the range of users of home aquariums.

The foregoing and ancillary objects are attained, the advantages realized and the afore-stated defects overcome by the present invention, the preferred embodiment of which is set forth, by way of example, in the following description, succinctly pointed out in the appended claims and illustrated in the accompanying drawing, wherein the figure is a fragmentary vertical sectional view of an aquarium provided with a gravel cleaning and filtering device made in accordance with the instant invention; all components of the device being shown in vertical section.

Referring now more particularly to the drawing, the numeral 10 designates a conventional tank or aquarium which is provided with a bed of gravel or sand 12 on its bottom wall 14. The gravel bed, as is conventional, is only a few inches in depth. The tank or aquarium is filled with water to the level 16.

The invention proper comprises an elongated tube or tubular member 18 which may be formed from any desired material, but, preferably, is fabricated from inexpensive material that can withstand immersion in water. The tube 18 has opposing open ends 20 and 22, the former being the upper end and the latter the lower end.

The tube 18 adjacent its lower end 22 is structurally associated with a base member 24 that is of conical form but which can assume any formation with the important factor being that its lower end is open and of greater dimension than its upper end. This is desired so that the base member seats well within the gravel bed.

The lower end portion of the tube 18, which is of a relatively small diameter in relation to the cross-sectional area of the tank 10, is passed through the open upper end 25 of the conical base member and is suitably affixed thereto, in a manner so that it is air-tight and solid therewith. The open lower end 22 of the tube terminates at a point slightly above the lower base end of the base member 24.

The tube or tubular member 18 is of a length so that its open upper end 20 is disposed above the water level 16, with the upper end being adapted to be attached to or associated with a source of air under pressure. In this regard, it is intended that such air source can be a means originating compressed air or can even be constituted by manual air pressure by applying one's mouth to the upper end and using air from the lungs. For this latter purpose, a length of flexible tubing can be attached to the upper end 20 and incorporate a mouthpiece to be used by an operator. It is also important to note that the upper end extends above the water level to function as a handle in manipulating the device to locations where impurities are embedded within the gravel in the aquarium.

The air entering the base member 24 as it passes through the tube 18 causes a severe agitation of the pebbles or gravel and results in a dislodgement therefrom of the dirt and sediment which gravitate into the gravel bed. This causes the dirt and sediment to rise about the outside of the base member and mix with the water and, also, effects a turbulence of the water.

In addition, the air, as it leaves the base member 24, creates a vacuum in the base member and to realize the effect of this, in attaining the objective of filtering the water, the base member is formed, above its lower end, which is submerged in the gravel bed, with apertures 26, the apertures being formed in the side wall of the base member above the lower end 22 of the air tube 18.

These apertures 26, which are formed in a circumferentially spaced series, are designed for the unrestricted flow of the water into the base member, under the vacuum conditions. Obviously, the continuously entering water will seek its higher level and, an escape and filtering entrapment means 28 is provided in structural association with the base member.

Such means 28 includes a tubular member 30, which may be rigid or flexible, and which is connected, in a diverging fashion, to an opening 32 in the upper portion of the base member and which terminates in an open outer end 34 that is located below the water level. The tubular member 30 may be fixed in the opening 32, as shown, or may be otherwise suitably attached to the base member so as to be in communication with the interior of the base member through the opening 32.

The means 28 further includes a porous filtering element 36 that is attached to the outer end 34 in such a way that all the water escaping from the base member, through the tubular member 30, must pass therethrough. As illustrated, the filtering element 36 is in the form of a fine mesh, porous, bag which has its open neck portion suitably circumposed in a fluid-tight, fixed but easily detachable manner, on the outer end of the tubular member 30. The filtering element constitutes a porous enclosure for the accumulation of impurities but will permit the easy passage of water therethrough.

In use, the upper end 20 of the assembled device is utilized as a handle in lowering the device into the aquarium, which is already provided with the gravel bed 12 and filled with water up to the level, for example, 16. The device is lowered into the aquarium until the base of the conical base member 24 is firmly situated in the gravel bed to provide a stable support with the apertures 26 being above the gravel bed.

Air under pressure, from any suitable source, is transmitted through the tube 18 from its upper end 20 and is discharged into the gravel bed. The air produces a severe agitation of the gravel bed causing the previously gravitated impurities, which are lighter than the pebbles or gravel, to rise and, also, effecting a turbulence of the water. The water is sucked into the base member through the apertures 26 with the water carrying the dislodged dirt and impurities. Such water, seeking its higher level, passes through the tubular member 30 and out through the filter bag 36, leaving behind in the filter bag 36 the dirt and impurities, which remain entrapped in the filter bag 36.

When the filter bag or filtering element 36 becomes full, it is but a simple matter to remove the device from the aquarium and replace the used bag with a new one. Obviously, the cost of such a replacement bag is negligible and the convenience of replacement can be appreciated.

It can thus be seen that the present invention essentially is constituted by an air tube, which doubles as a handle, a base member with apertures and defining a support and a vacuum chamber and a filtering means associated with the base member and lying below the water level. As can be appreciated from a consideration of the drawing, the air tube 18, base member 24 and water outflow tube 30 may be formed in integral relation as one piece. More particularly, the device essentially composed of such parts, may be molded in one piece from inexpensive commercial plastics.

The tubular member 30 is preferably rigid, but if desired, a flexible tubing extension may be attached to member 30 as a substitute for the filter bag 36. This flexible extension would act as a means of conveyance of impurities to a location remote and above the water level of the tank.

Thus, the prime objective of cleaning the gravel, circulating and filtering the water is realized by a device which is not permanently a part of the tank, but may be utilized in selected areas within the tank at the discretion of the operator.

However, while the best known embodiment of this invention has been described herein and illustrated in the accompanying drawing, other forms may be realized as come within the scope and spirit of the appended claims.

What is claimed is:

1. For use in an aquarium tank, a water-treating means comprising a hollow base member having an open lower end adapted to be seated in a gravel bed in the tank and maintain the base member in a substantially vertical position in the tank, an air tube extending in an air-tight manner substantially vertically into the base member and terminating in an open lower end disposed within the base member above the lower end thereof and through which air under pressure is adapted to be passed into the gravel bed under the lower end of the base member to agitate the gravel bed and dislodge impurities therefrom and to create a vacuum in the interior of the base member, said base member being formed above the lower end of the air tube with apertures to permit water to enter into the interior of the base member under the vacuum conditions existing therein and filtering means structurally associated with the base member above the apertures and in communication with the interior thereof so that the water entering the base member through the apertures must pass therethrough in returning to the tank.

2. For use in an aquarium tank, a water-treating means comprising a hollow base member adapted to be seated in a gravel bed in the tank, a substantially vertical air tube extending air-tightly into the base member and terminating in an open lower end disposed within the interior of the base member and through which air under pressure is adapted to be passed into the gravel bed underlying the base member to agitate the gravel bed and dislodge impurities therefrom and to create a vacuum in the interior of the base member, said base member being formed above the lower end of the air tube with apertures to permit water to enter into the interior of the base member under the vacuum conditions existing therein, said base member having an opening provided above the apertures through which the water in the interior of the base member can return back into the tank and filtering means connected to the opening to entrap the impurities as the water leaves the base member through the opening.

3. For use in an aquarium tank having a particulate bed and containing water, a water-treating means comprising a hollow base member having an open lower end adapted to be seated in the bed in the tank, a substantially vertical air tube extending air-tightly into the base member and terminating in an open lower end disposed within the interior of the base member above the lower end thereof and through which air under pressure is adapted to be passed directly into the bed underlying the lower end of the base member to agitate the bed and dislodge impurities therefrom and to create a vacuum in the interior of the base member, said base member being formed above the lower end of the air tube with apertures to permit water to enter into the interior of the base member under the vacuum conditions existing therein, said base member having an opening provided above the apertures through which the water in the interior of the base member can return back into the tank and filtering means connected to the opening to entrap the impurities as the water leaves the tank through the opening, said filtering means being adapted to lie submerged in the water and including a disposable, porous element connected to the opening.

4. For use in an aquarium tank having a particulate bed and containing water, a water-treating means comprising a hollow base member having an open lower end adapted to be seated in the bed in the tank, a substantially vertical air tube extending air-tightly into the base member and terminating in an open lower end disposed within the interior of the base member above the lower end thereof and through which air under pressure is adapted to be passed directly into the bed underlying the lower end of the base member to agitate the bed and dislodge impurities therefrom and to create a vacuum in the interior of the base member, said base member being formed above the lower end of the air tube with apertures to permit water to enter into the interior of the base member under the vacuum conditions existing therein, said base member having an opening provided above the apertures through which the water in the interior of the base member can return back into the tank and filtering means connected to the opening to entrap the impurities as the water leaves the tank through the opening, said filtering means including a tubular member connected to the opening and terminating in an outer outlet and disposed within the water in the tank and a porous, displaceable bag-like element removably secured on the outer end of the tubular member and submerged within the water in the tank.

5. For use in an aquarium tank, a water-treating means comprising a hollow base member having an open major lower end adapted to be seatingly embedded in a gravel bed in the tank and having a side wall and an upper minor end, an air tube connected to and extending air-tightly into the base member adjacent the upper end thereof and disposed substantially vertically in the interior of the base member and terminating therein in an open lower end disposed slightly above the lower end of the base member and through which air under pressure is adapted to be passed into the gravel bed directly underlying the base member to agitate the gravel bed and dislodge impurities therefrom and to create a vacuum in the interior of the base member, said side wall of the base member being formed above the lower end of the air tube with apertures to permit water to enter into the interior of the base member under the vacuum conditions existing therein, said base member having an opening formed in the side wall above the apertures and adjacent the upper end of the base member through which the water in the interior of the base member can return back into the tank and filtering means connected to the opening to entrap the impurities as the water leaves the tank through the opening, said filtering means including a tubular member divergently connected to the opening and adapted to be entirely submerged in the water and terminating in an outer open end and a porous bag removably secured to the outer end of the tubular member.

6. For use in an aquarium tank, a water-treating means comprising a hollow base member having an open lower base end adapted to be seated in a gravel bed in the tank and having a side wall and an upper end, a substantially rigid vertical air tube connected to and extending into the base member air-tightly through the upper end of the base member and terminating in an open lower end disposed slightly above the open base end of the base member and through which air under pressure is adapted to be passed into the gravel bed directly underlying the base member to agitate the gravel bed and dislodge impurities therefrom and to create a vacuum in the interior of the base member, said side wall of the base member being formed above the lower end of the air tube with apertures to permit water surrounding the base member to enter into the interior of the base member under the vacuum conditions existing therein and filtering means connected to the side wall of the base member above the apertures and adjacent the upper end of the base member for the outflow of water in the interior of the base member so that the water entering the base member passes therethrough in returning to the tank, said air tube having an open upper end extending above the water level in the tank and adapted to receive a source of air under pressure and to function as a handle in placing said water-treating means into the tank and removing it therefrom.

7. For use in an aquarium tank, a water-treating means comprising a hollow conical base member having an open major lower end adapted to be seated in a gravel bed in the tank and having a side wall and an upper apex and provided with an axial opening, a vertical air tube connected to and extending into the base member air-tightly through the opening in the upper end and disposed vertically within the interior of the base member and terminating therein in an open lower end disposed slightly above the lower end of the base member and through which air under pressure is adapted to be passed into the gravel bed directly underlying the base member to agitate the gravel bed and dislodge impurities therefrom and to create a vacuum in the interior of the base member, said side wall of the base member being formed above the lower end of the air tube with apertures to permit water surrounding the base member to enter into the interior of the base member under the vacuum conditions existing therein and filtering means connected to the side wall of the base member above the apertures and adjacent the upper end of the base member so that the water entering the base member passes therethrough in returning to the tank.

8. For use in an aquarium tank, a water-treating means comprising a hollow substantially conical base member having an open major lower end adapted to be seated in a gravel bed in the tank and having a side wall and an upper apex and provided with an axial opening, a vertical substantially rigid air tube connected to and extending into the base member air-tightly through the opening in the upper end and disposed vertically within substantially the center of the interior of the base member and terminating therein in an open lower end disposed slightly above the lower end of the base member and through which air under pressure is adapted to be passed directly into the gravel bed underlying the interior of the base member to agitate the gravel bed and dislodge impurities therefrom and to create a vacuum in the interior of the base member, said side wall of the base member being formed above the lower end of the air tube with a series of circumferentially spaced apertures to permit water surrounding the base member to enter into the interior of the base member under the vacuum conditions existing therein and filtering means connected to the side wall of the base member above the apertures and adjacent the upper end thereof so that the water entering the base member passes therethrough in returning to the tank, said filtering means being adapted to be submerged in the water and including a disposable porous element.

9. A filtering and particulate bed cleaning device for an aquarium comprising a hollow conical base member having a side wall, an open base end and an upper apex end formed with an axial opening, a substantially rigid vertical air tube for the passage of air under pressure having a lower end portion vertically inserted through said opening and air-tightly connected thereto, said lower end portion extending vertically into the interior of the base member substantially centrally thereof and terminating in an open lower end disposed slightly above the base end of the base member, said air tube having an upper open end portion adapted to be communicated with a source of air under pressure and to be used as a handle in the placement of the device in an aquarium, said base member having apertures formed in its side wall above the lower end of the air tube, a substantially rigid tubular member connected to the side wall above the apertures and diverging upwardly therefrom and communicated with the interior of the base member for the outward passage of water from the interior of the base member, said tubular member terminating below the upper end portion of the air tube in an open outlet end and a disposable, porous element connected to the outlet end of the tubular member.

10. The device of claim 9, wherein said base member, air tube and tubular member are integral.

11. The device of claim 9, wherein said base member, air tube and tubular member are of one-piece plastic formation.

References Cited

UNITED STATES PATENTS

| | | | |
|---|---|---|---|
| 2,076,823 | 4/1937 | Newell | 210—169 |
| 2,820,548 | 1/1958 | Marcus et al. | 210—169 |
| 2,956,507 | 10/1960 | Hutchinson | 210—169 |
| 3,225,930 | 12/1965 | Willinger | 210—169 X |

FOREIGN PATENTS 1,282,685  12/1961  France.

OTHER REFERENCES

German printed application W13420, August 1956.

REUBEN FRIEDMAN, *Primary Examiner.*

F. MEDLEY, *Assistant Examiner.*